US012631231B2

(12) United States Patent
Yang et al.

(10) Patent No.: US 12,631,231 B2
(45) Date of Patent: *May 19, 2026

(54) EXTERNAL DRUM BRAKE ANTI-FALLING DEVICE

(71) Applicant: BEXUS INDUSTRIES CO., LTD.,
Taichung City (TW)

(72) Inventors: Kai Chieh Yang, Taichung City (TW);
Chia Cheng Huang, Taichung City
(TW)

(73) Assignee: BEXUS INDUSTRIES CO., LTD.,
Taichung City (TW)

( * ) Notice: Subject to any disclaimer, the term of this
patent is extended or adjusted under 35
U.S.C. 154(b) by 1206 days.

This patent is subject to a terminal dis-
claimer.

(21) Appl. No.: 17/398,010

(22) Filed: Aug. 10, 2021

(65) Prior Publication Data

US 2022/0370841 A1 Nov. 24, 2022

(30) Foreign Application Priority Data

May 21, 2021 (TW) ................................. 110118434

(51) Int. Cl.
| | |
|---|---|
| *F16D 65/54* | (2006.01) |
| *A62B 1/10* | (2006.01) |
| *A62B 35/00* | (2006.01) |
| *F16D 51/04* | (2006.01) |
| *F16D 65/22* | (2006.01) |

(52) U.S. Cl.
CPC .............. *F16D 65/546* (2013.01); *A62B 1/10*
(2013.01); *A62B 35/0093* (2013.01); *F16D*
*51/04* (2013.01); *F16D 65/22* (2013.01)

(58) Field of Classification Search
CPC ...... F16D 65/546; F16D 65/226; F16D 65/22;
F16D 51/04; A62B 1/10; A62B 1/08;
A62B 1/06; A62B 1/00; A62B 35/0093
USPC ............................................................ 182/5
See application file for complete search history.

(56) References Cited

U.S. PATENT DOCUMENTS

| | | | | |
|---|---|---|---|---|
| 199,078 A | * | 1/1878 | Lumpert .................. | A62B 1/10 |
| | | | | 254/269 |
| 2,047,556 A | * | 7/1936 | Harvey ................... | F16D 65/22 |
| | | | | 188/335 |
| 3,386,535 A | * | 6/1968 | Bishop .................... | F16D 65/04 |
| | | | | 188/336 |

(Continued)

*Primary Examiner* — Daniel P Cahn
*Assistant Examiner* — Shiref M Mekhaeil
(74) *Attorney, Agent, or Firm* — Che-Yang Chen

(57) ABSTRACT

An external drum brake anti-falling device includes a carrier
having an accommodating chamber and a main shaft cross-
ingly arranged in the accommodating chamber for support-
ing a rotating drum to autorotate, wherein the rotating drum
has a life belt coiled thereon, a brake unit arranged at an end
thereof, and a drum brake module, which includes a base,
mounted in the accommodating chamber, and a passive ring,
mounted on the base. The base has a through hole axially
and penetratingly arranged thereon and a slit communicating
an inside and outside of said through hole. The wall surface
of the through hole is a first ring surface. An outer diameter
of the passive ring is a second ring surface. The passive ring
has internally ratchet teeth arranged therein. when the life
belt drives the brake unit to be engaged with the ratchet
teeth, thereby buffering the rotating drum and the life belt.

18 Claims, 7 Drawing Sheets

(56) References Cited

U.S. PATENT DOCUMENTS

| | | | | | |
|---|---|---|---|---|---|
| 3,596,849 | A * | 8/1971 | Tamarin | | H02G 11/02 |
| | | | | | 242/385.1 |
| 4,018,423 | A * | 4/1977 | Belew | | A62B 1/12 |
| | | | | | 188/291 |
| 4,125,142 | A * | 11/1978 | Fohl | | E06B 9/84 |
| | | | | | 160/300 |
| 4,196,797 | A * | 4/1980 | Taylor | | F16D 49/16 |
| | | | | | 192/223 |
| 4,511,123 | A * | 4/1985 | Ostrobrod | | A62B 1/10 |
| | | | | | 254/378 |
| 4,736,503 | A * | 4/1988 | Stock | | F16D 65/08 |
| | | | | | 29/34 R |
| 4,877,110 | A * | 10/1989 | Wolner | | A62B 35/0093 |
| | | | | | D29/124 |
| 4,938,435 | A * | 7/1990 | Varner | | A62B 1/08 |
| | | | | | 182/5 |
| 5,246,093 | A * | 9/1993 | Wang | | B23P 15/18 |
| | | | | | 188/336 |
| 5,351,906 | A * | 10/1994 | Feathers | | A62B 1/10 |
| | | | | | 242/396.6 |
| 5,415,256 | A * | 5/1995 | Weigand | | F16D 65/12 |
| | | | | | 464/30 |
| 5,447,280 | A * | 9/1995 | Feathers | | A62B 35/0093 |
| | | | | | 242/396.6 |
| 5,722,612 | A * | 3/1998 | Feathers | | A62B 35/0093 |
| | | | | | 242/381.5 |
| 5,829,548 | A * | 11/1998 | Ostrobrod | | E06C 7/18 |
| | | | | | 182/241 |
| 6,279,682 | B1 * | 8/2001 | Feathers | | A62B 35/0093 |
| | | | | | 182/239 |
| 6,810,997 | B2 * | 11/2004 | Schreiber | | A62B 1/10 |
| | | | | | 182/233 |
| 7,104,370 | B2 * | 9/2006 | Wang | | F16D 51/04 |
| | | | | | 188/336 |
| 8,430,206 | B2 * | 4/2013 | Griffiths | | A62B 35/0093 |
| | | | | | 182/237 |
| 8,430,207 | B2 * | 4/2013 | Griffiths | | A62B 1/08 |
| | | | | | 242/381.5 |
| 8,430,208 | B2 * | 4/2013 | Griffiths | | A62B 1/08 |
| | | | | | 242/383.3 |
| 8,800,715 | B2 * | 8/2014 | Olson | | A62B 1/10 |
| | | | | | 182/237 |
| 9,056,753 | B2 * | 6/2015 | Luntz | | B66D 3/046 |
| 9,488,235 | B2 * | 11/2016 | Casebolt | | A62B 1/10 |
| 9,764,172 | B2 * | 9/2017 | Wolner | | A62B 35/0093 |
| 9,861,841 | B1 * | 1/2018 | Hung | | A62B 35/0093 |
| 10,143,867 | B2 * | 12/2018 | Su | | A62B 35/0075 |
| 10,556,138 | B2 * | 2/2020 | Fegley | | A62B 35/0093 |
| 10,661,106 | B2 * | 5/2020 | Choate | | A62B 35/0093 |
| 11,504,557 | B2 * | 11/2022 | Boraas | | A62B 35/04 |
| 11,892,046 | B2 * | 2/2024 | Yang | | F16D 65/22 |
| 11,938,350 | B2 * | 3/2024 | Jones | | A62B 1/10 |
| 2005/0051659 | A1 * | 3/2005 | Wolner | | A62B 35/0093 |
| | | | | | 242/383.5 |
| 2005/0217937 | A1 * | 10/2005 | Rohlf | | A62B 1/16 |
| | | | | | 182/232 |
| 2006/0225975 | A1 * | 10/2006 | Pfaff | | F16D 65/22 |
| | | | | | 188/250 E |
| 2009/0078505 | A1 * | 3/2009 | Casebolt | | A62B 35/0093 |
| | | | | | 254/266 |
| 2009/0211848 | A1 * | 8/2009 | Parker | | A62B 1/10 |
| | | | | | 182/231 |
| 2010/0025157 | A1 * | 2/2010 | Casebolt | | A62B 35/0093 |
| | | | | | 182/231 |
| 2010/0224448 | A1 * | 9/2010 | Wolner | | A62B 1/10 |
| | | | | | 182/234 |
| 2010/0226748 | A1 * | 9/2010 | Wolner | | A62B 35/0093 |
| | | | | | 414/815 |
| 2010/0282541 | A1 * | 11/2010 | Renton | | A62B 1/18 |
| | | | | | 182/234 |
| 2011/0209948 | A1 * | 9/2011 | Auston | | A62B 35/0093 |
| | | | | | 188/68 |
| 2013/0105247 | A1 * | 5/2013 | Casebolt | | A62B 35/0093 |
| | | | | | 188/185 |
| 2013/0248291 | A1 * | 9/2013 | Jones | | A62B 35/0018 |
| | | | | | 182/241 |
| 2014/0190770 | A1 * | 7/2014 | Renton | | A62B 35/04 |
| | | | | | 182/236 |
| 2014/0251731 | A1 * | 9/2014 | Jones | | F16F 7/087 |
| | | | | | 182/231 |
| 2016/0236018 | A1 * | 8/2016 | Chen | | A62B 35/0093 |
| 2016/0367844 | A1 * | 12/2016 | Yang | | A62B 35/0093 |
| 2018/0015312 | A1 * | 1/2018 | Jones | | A62B 35/0093 |
| 2018/0169446 | A1 * | 6/2018 | Griffiths | | A62B 1/10 |
| 2019/0083827 | A1 * | 3/2019 | Hung | | A62B 35/0093 |
| 2019/0247683 | A1 * | 8/2019 | Farrell | | F16F 7/12 |
| 2019/0275356 | A1 * | 9/2019 | Jones | | A62B 1/10 |
| 2020/0023211 | A1 * | 1/2020 | Chang | | A62B 1/10 |
| 2020/0078621 | A1 * | 3/2020 | Chen | | A62B 1/10 |
| 2022/0161072 | A1 * | 5/2022 | Hung | | A62B 35/0093 |
| 2022/0241626 | A1 * | 8/2022 | Yang | | B65H 75/4442 |
| 2022/0373049 | A1 * | 11/2022 | Yang | | F16D 65/22 |
| 2023/0228305 | A1 * | 7/2023 | Schrank | | F16D 63/006 |
| | | | | | 182/232 |
| 2023/0271038 | A1 * | 8/2023 | Schrank | | A62B 35/0093 |
| | | | | | 182/232 |

* cited by examiner

EXTERNAL DRUM BRAKE ANTI-FALLING DEVICE

BACKGROUND OF THE PRESENT INVENTION

Field of Invention

The present invention relates to the field of external drum brake anti-falling device that has a better brake and deceleration performance and allows modulized assembling.

Description of Related Arts

A prior art, as illustrated in U.S. Pat. No. 9,861,841 B1, "Fall Protection Device," has a deceleration member capable of auto-rotating around a main shaft, wherein an end of the deceleration member is affixed on a brake unit and the outer circumferential surface thereof utilizes its friction side to bond with an inner toroidal surface of a rotating drum, wherein the external toroidal surface of the rotating drum has a life belt surrounded therearound, wherein the outer end of the life belt is tied to the user, such that when the user falls, the deceleration member is fixed and the rotating drum can rotate relatively to the deceleration member, so that a rotation friction force is generated between the friction side and the inner toroidal surface, so as to slow down the rotating speed of the rotating drum, and to buffer the falling speed of the life belt.

When the life belt drives the rotating drum to rotate relatively to the deceleration member, the actuating arm formed by the life belt is much larger than the resistant arm formed by the deceleration member, and under the synergistic action of gravity acceleration of the user falling, the friction surface can wear and fail even after the drum has gone for less than two circles, rendering the deceleration member fail to slow down the subsequent rotation of the rotating drum. Accordingly, the prior case certainly has a problem of short durability buffering performance. Furthermore, the prior case has a disadvantage of difficult to maintain because the replacements of the main shaft, the deceleration member, and the rotating drum are not only costly, but also time-consuming and labor-consuming in disassembling and reassembling the frame and the brake unit.

SUMMARY OF THE PRESENT INVENTION

The present invention mainly provides a main shaft arranged across an accommodating chamber of a carrier, a rotating drum capable of auto-rotating around the main shaft, a safety belt coiled around the rotating drum, a brake unit arranged at an end of the rotating drum, and a drum brake module mounted thereon. The drum brake module has a base mounted in the accommodating chamber and a passive ring mounted on the base. The base has a through hole axially penetrated therethrough to define a first ring surface configured in a concentric circle manner with the main shaft. The outer diameter of the passive ring defines a second ring surface opposite to and closely fitting to the first ring surface and has internally toothed ratchet teeth arranged in a concentric circle manner with the second ring surface to allow the life belt to bring the brake unit buckling with the ratchet teeth so as to control the first ring surface and the second ring surface to sequentially generate a maximum static friction force and kinetic friction force, thereby decelerating the auto-rotation of the passive ring, thereby buffering the rotating drum and the life belt, and effectively improving the plurality of drawbacks of U.S. Pat. No. 9,861,841B1.

The present invention also provides that: the first ring surface and the second ring surface are further controlled to maintain a circle-shaped gap therebetween, wherein the gap has a brake lining tightly matched therein, wherein the brake lining is affixed on either the first ring surface or the second ring surface for decelerating the auto-rotation of the passive ring. By means of the addition of the brake lining, it is capable of achieve the double buffering effect of maximum static friction force and kinetic friction force in order relatively easily.

DETAILED DESCRIPTION OF THE PREFERRED EMBODIMENT

Figure 1:
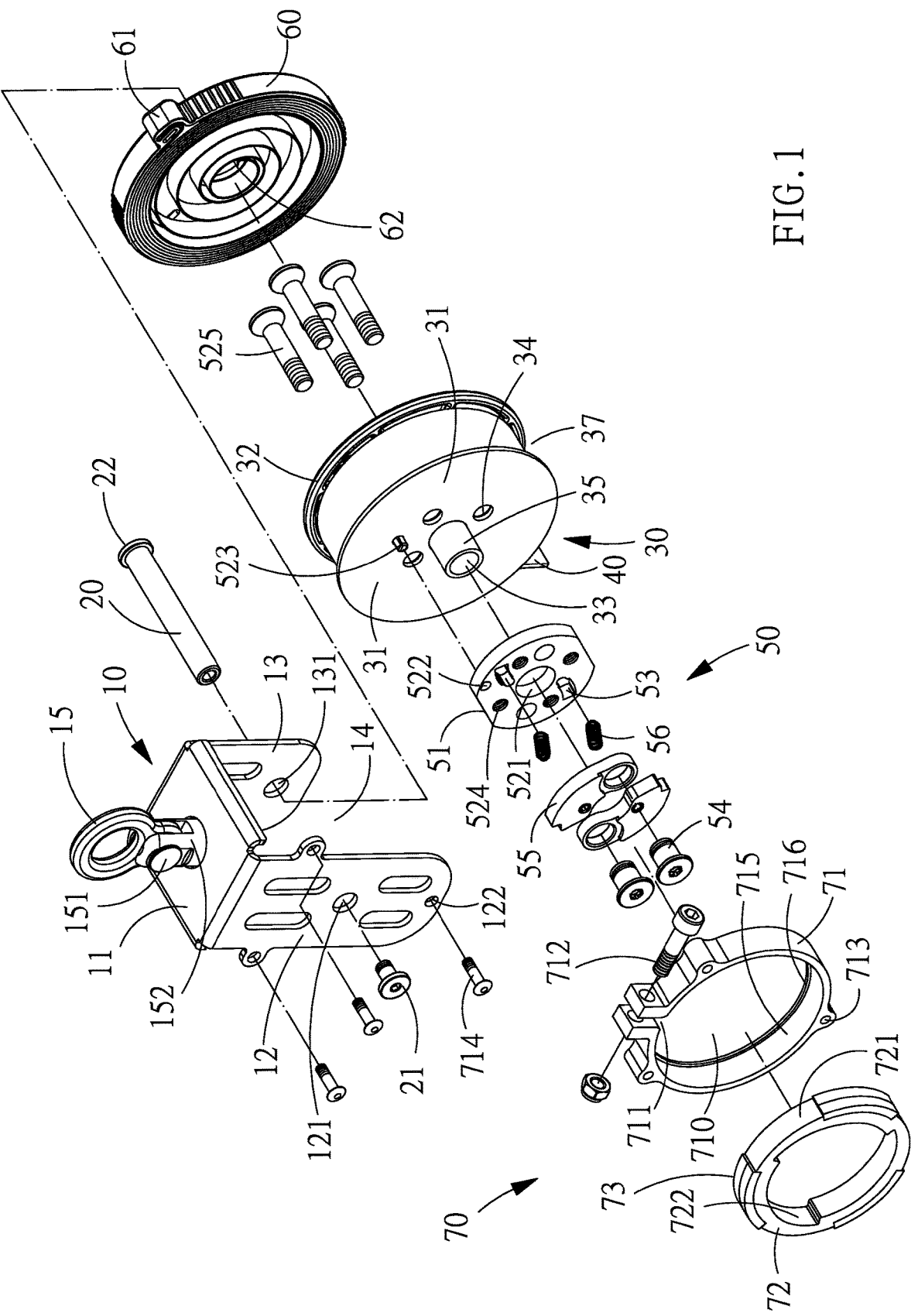
FIG. 1 is an exploded view of the present invention.
Figure 2:
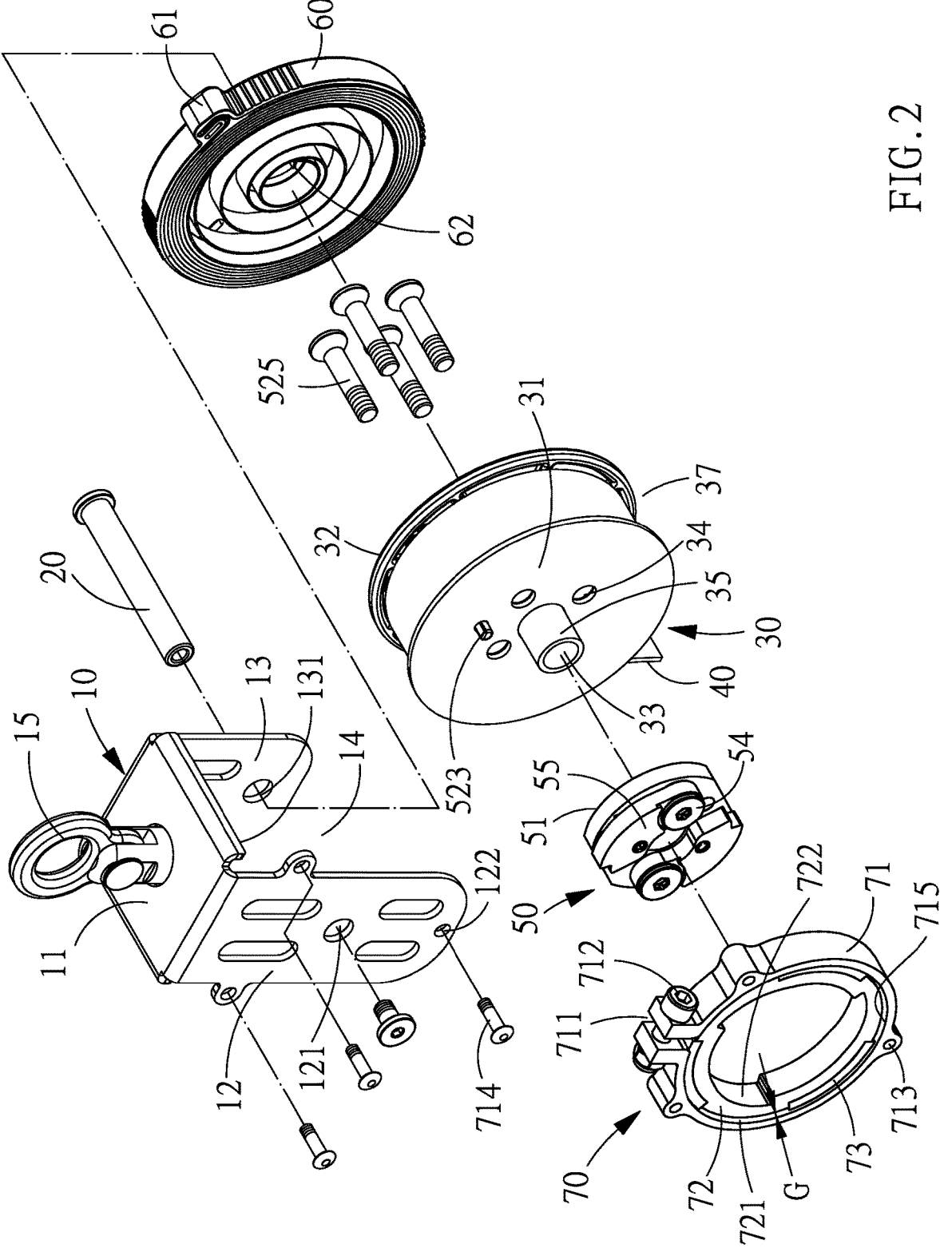
FIG. 2 is a partially assembling view of a brake unit and a drum brake module of FIG. 1

Referring to FIGS. 1-7, the present invention provides an external drum brake anti-falling device, which comprises a carrier 10, a main shaft 20, a rotating drum 30, a brake unit 5, a turbination spring 60, and a drum brake module 70.

The carrier 10 has a left plate 12 and a right plate 13 symmetrically extending downwardly from a transverse plate 11 so as to define a chamber 14 thereamong; a hoisting ring 15 is mounted on top of the transverse plate 11, wherein the bottom of the hoisting ring 15 is pivotally mounted to the top of a longitudinal axle 152 through a transverse pin 151, the bottom of the longitudinal axle 152 is rotatably mounted on the transverse plate 11, and that after the hoisting ring 15 is affixed to an upper air anchor point, the carrier 10 can adjust the angle in accordance to the movement of the user. The left plate 12 has a first hole 121 arranged thereon and communicated with the inside and the outside of the accommodating chamber 14, three second holes 122 symmetrically penetratingly provided thereon at the positions surrounding to the first hole 121 as the circle center, and a third hole 131 matched with the first hole 121, penetratingly provided on the right plate 13.

The main shaft 20 is mounted on the carrier 10, to bridge the first hole 121 and the third hole 131 and cross the chamber 14, wherein an end of the main shaft 20 has a buckle member 21 provided thereon in the outer side of the left plate 12 for stopping, while the other end has a head 22 protrudingly provided thereon in the outer side of the right plate 13 for stopping, so that the main shaft 20 is detachably mounted on the carrier 10.

Figure 3:
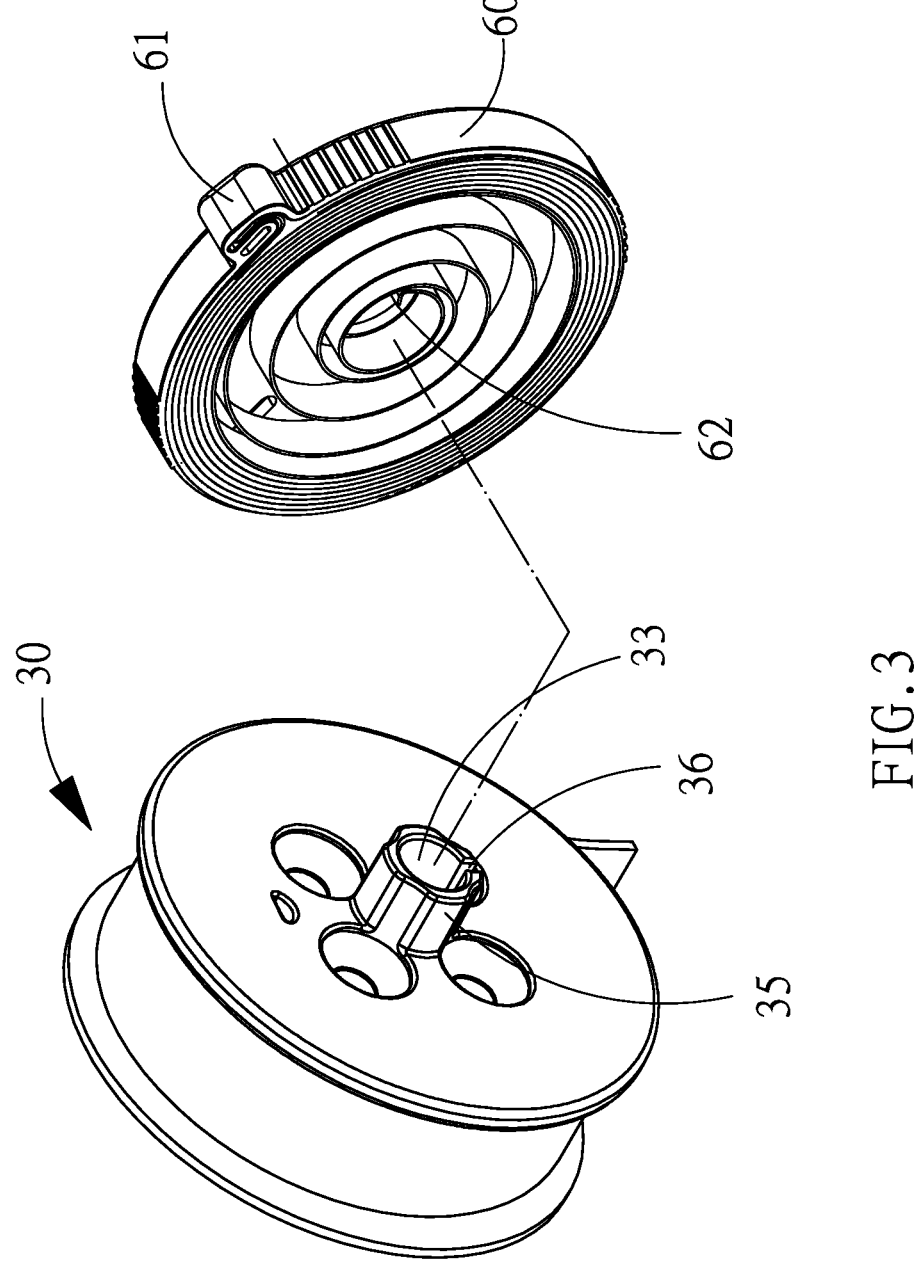
FIG. 3 is an assembling view of a rotating drum and a turbination spring.
Figure 4:
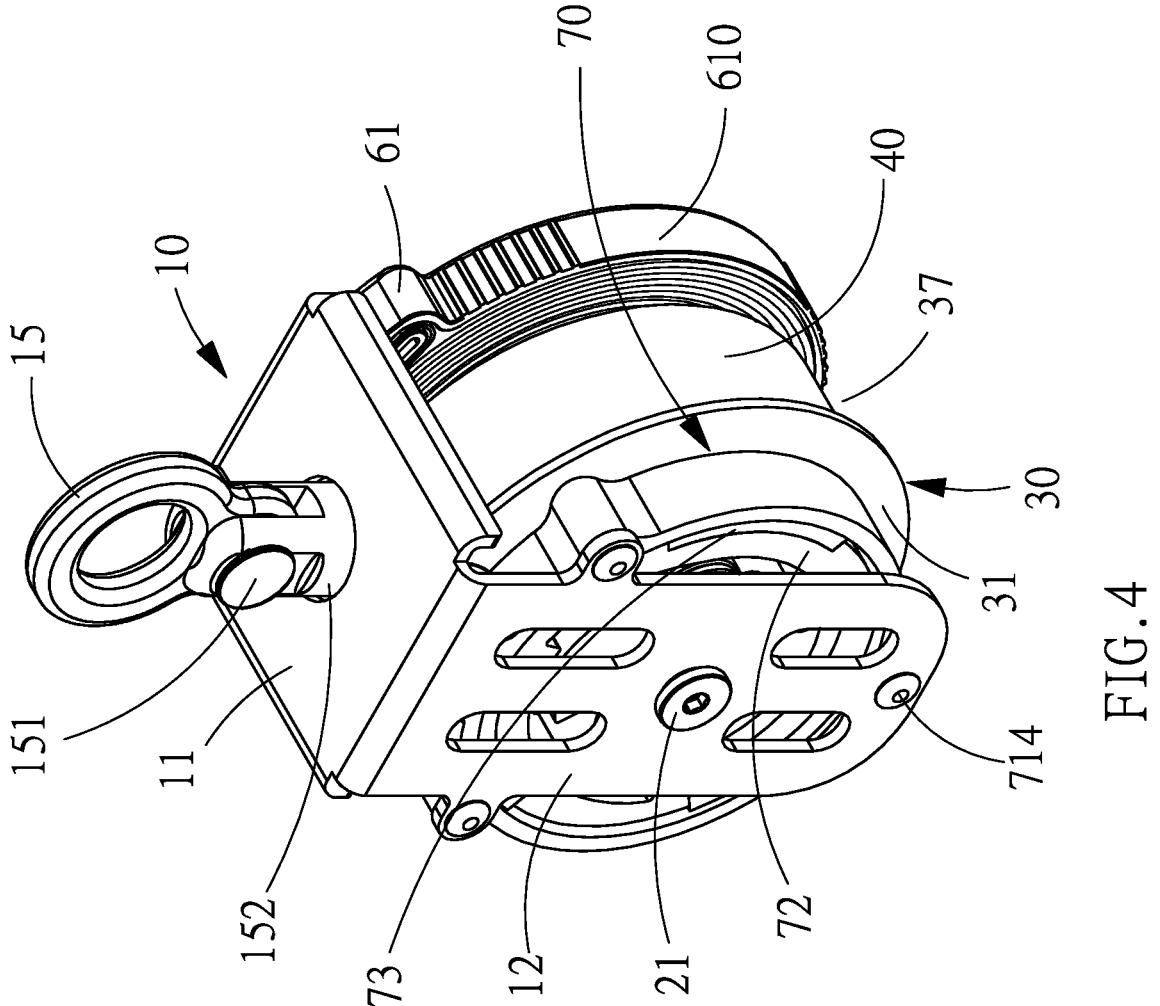
FIG. 4 is an assembling view of FIG. 1.
Figure 5:
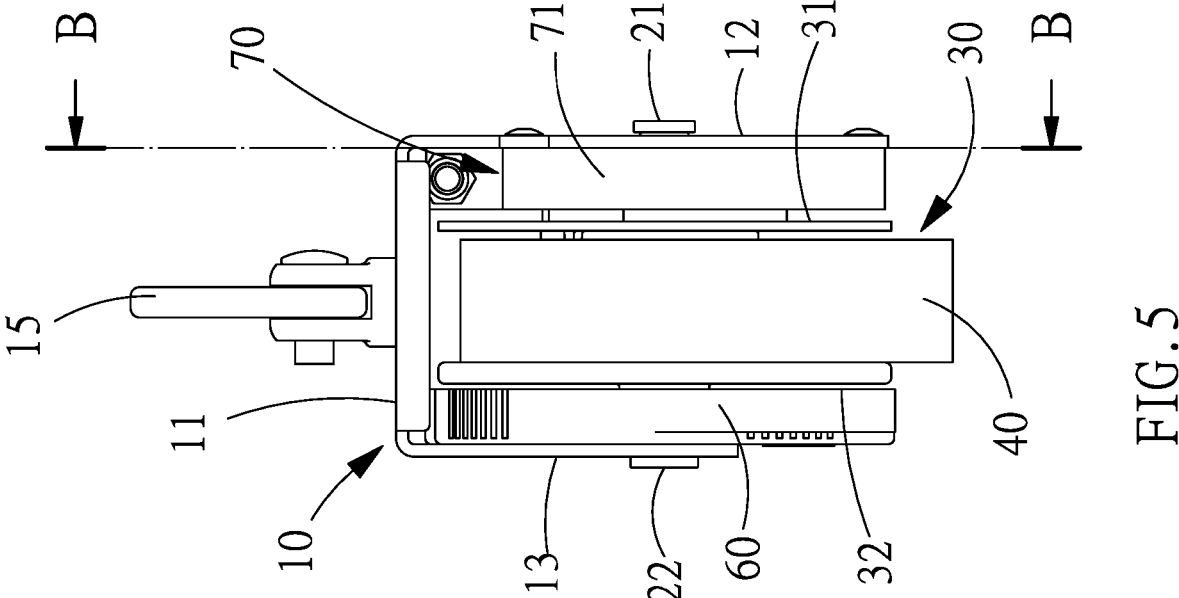
FIG. 5 is a rear view of FIG. 4.

The rotating drum 30 has a left end 31 and a right end 32 opposite to each other, and an axle hole 33 penetratingly provided at a circle center position for the main shaft 20 to pass through for pivotally arranged the drum 30 in the chamber 14. Besides, the rotating drum 30 further has a plurality of lockholes 34 penetratingly provided thereon parallel to the axle hole 33. The left end 31 and the right end 32 are axially protruded along the periphery of the axle hole 31 to form an annular protruding lip 35, as illustrated in FIG. 3, wherein the annular protruding lip 35 of the right end 32 has an assembling groove 36 provided in a radial manner so as for an inner end 62 of a turbination spring 60 to be mentioned later to be affixed thereon. The outer peripheral ring of the rotating drum 30 has a spacing area 37 so as for an end of the life belt 40 to be affixed and coiled there-around, and the other end of the life belt 40 to protrude from the accommodating chamber 14, so as to be tied to the user's safety cloth, so that when the user moves and pulls the life belt 40, the drum 30 can rotate around the main shaft 20 in response.

Figure 6:
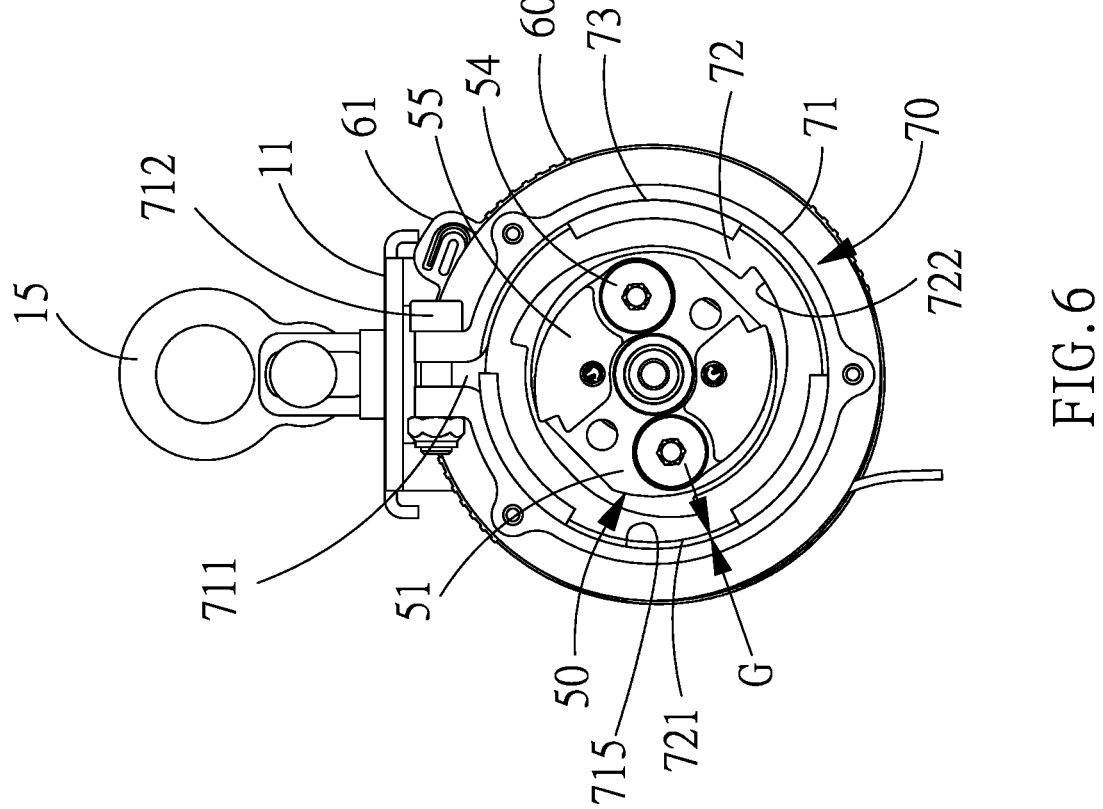
FIG. 6 is a perspective view of the B-B position of FIG. 5, for illustrating the brake unit and the drum brake module not in a brake mode.
Figure 7:
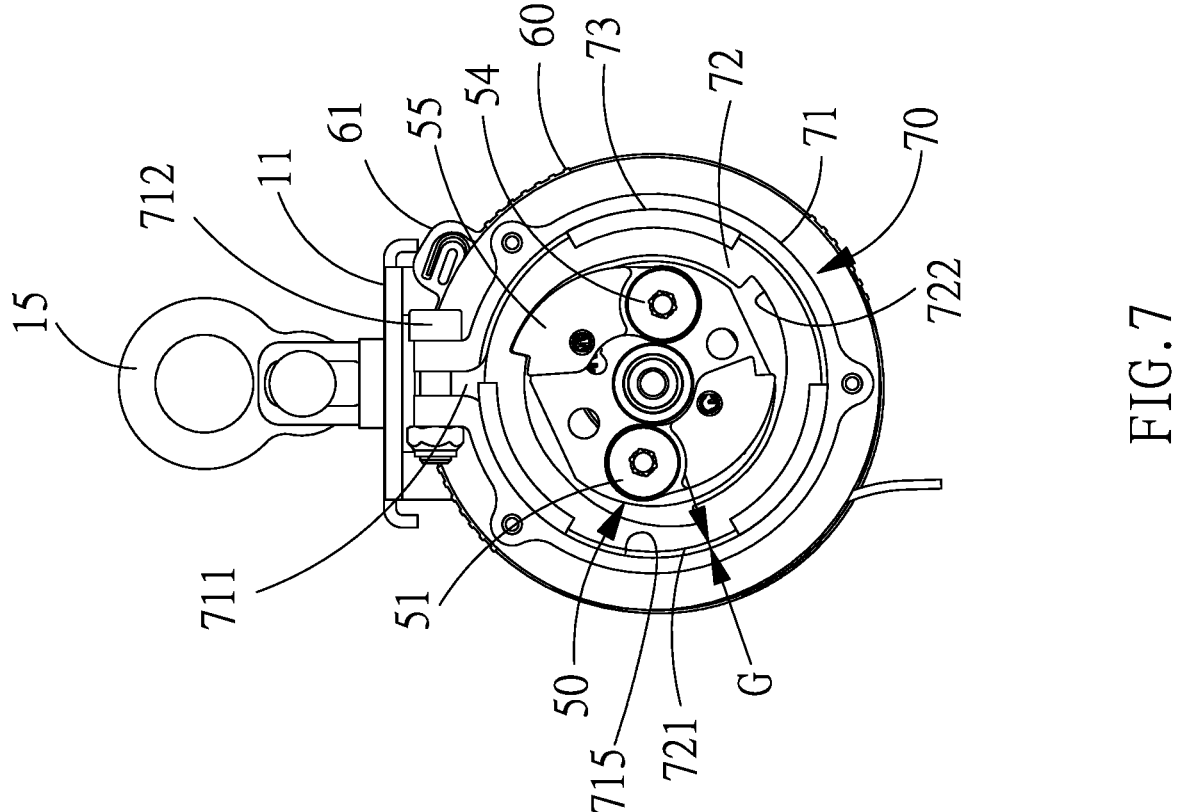
FIG. 7 is a perspective view of the brake unit and the drum brake module of FIG. 6 in a brake mode.

The brake unit 50 comprises an abuttal 51 mounted on the left end 31 of the rotating drum 30, wherein the center of the abuttal 51 has a fourth hole 521 arranged thereon for allowing the annular protruding lip 35 to be inserted therein, a fifth hole 522 eccentrically arranged thereon, wherein the fifth hole 522 allows a latch 523 to be inserted therein aiming the left end 31 of the rotating drum 30, and a screw hole 524 arranged thereon at the position corresponding to the lock hole 34 to allow the lock bolt 525 to screw lock the abuttal 51 to the left end 31 of the rotating drum 30, so that the abuttal 51 can be integrally linked with and moved with the rotating drum 30. Two axle seats 54 and two spring seats 53 symmetrically arranged on the abuttal 51 respectively, a centrifugal block 55 pivotally connected with the axle seat 54, and a back spring 56 mounted between the centrifugal block 55 and the spring seat 53, as illustrated in FIG. 6, so that the back spring 56 provides a constant retracting and positioning tendency for the centrifugal block 55, but when the life belt 40 is rotated to a certain speed due to the drive of the falling of the user, as illustrated in FIG. 7, the centrifugal block 55 can overcome the back spring 56 and buckle with the ratchet teeth 722.

The turbination spring 60, referring to FIGS. 1 and 3, is mounted on the right end 32 of the rotating drum 30, wherein the turbination spring 60 has an outer end 61 positioned at the transverse plate 11 and an inner end 62 affixed in the assembling groove 36 of the rotating drum 30 for constantly providing a rollback force to the rotating drum 30 for positioning, so as to prevent the life belt 40 from randomly moving out when the user is walking, wherein the life belt 40 can gradually overcome the turbination spring 60 to allow the rotating drum 30 and the brake unit 50 to synchronously auto-rotate around the main shaft 20 in responding to the life belt 40 being slowing pulled out.

The drum brake module 70 comprises a base 71 mounted in the chamber 14, a passive ring 72 arranged in a concentric circle manner with the main shaft 20, and a brake lining 73 for mounting the passive ring 72 onto the base 71. The base 71 has a through hole 710 axially penetratingly arranged thereon, a slit 711 radially communicating the inside and outside of the through hole 710, at least a check bolt 712 adapted for crossing the slit 711, and a plurality of sixth holes 713, wherein a screw 714 passes through the second hole 122 to be locked on the sixth hole 713, so as to detachably mount the base 71 to the chamber 14. The wall surface of the through hole 710 is defined as the first ring surface 715, wherein the first ring surface 715 is controlled to be arranged in a concentric circle manner with the main shaft 20, so as to allow the check bolt 712 to rotate to adjust the width of the slit 711 so as to adjust the aperture of the first ring surface 715 in order for adjusting the fitting degree of the gap G to the brake lining 73. The right end of the first ring surface 715 has an annular retaining lip 716 with shrank bore diameter so as to allow the passive ring 72 to be limited between the annular retaining lip 716 and the inner wall of the accommodating chamber 14, which therefore prevents the passive ring 72 from escaping from the first ring surface 715 during the autorotation thereof. The outer diameter of the passive ring 72 is defined as a second ring surface 721 that matches the first ring surface 715 in a manner of controlling a circle-like gap G formed and kept between the first ring surface 715 and the second ring surface 721 for three brake linings 73 to be closely fit therein, wherein the check bolt 712 is adapted to adjust the precompression of the fitting of the brake lining 73, so that the first ring surface 715 and the second ring surface 721 can be relatively tightly matched, so as to mount the passive ring 72 on the base 71, wherein part of the brake lining 73 is pre-embedded and affixed in a groove preset on the second ring surface 721 in an integral manner through adhering or other means. The passive ring 72 further has internally toothed ratchet teeth 722 disposed thereon in a concentric circle manner with the second ring surface 721, wherein the ratchet teeth 722 match the brake unit 50, so that when the user falls, as illustrated in FIG. 7, the life belt 40 will drives the rotating drum 30 and the brake unit 50 to rotate to a certain speed, rendering the centrifugal block 55 of the brake unit 50 to buckle with the ratchet teeth 722, so as to act on the autorotation of the passive ring 72 and control the maximum static friction force to reduce the torque borne by the passive ring 72 to provide a first buffering effect, wherein the auto-rotation of the passive ring 72 also generates kinetic friction force between the brake lining 73 and the first ring surface 715, thereby effectively decelerating the auto-rotations of the passive ring 72 and the rotating drum 30 so as to continuously buffer the falling speed of the life belt 40 to provide a second buffering effect, wherein these sequentially generated the maximum static friction force and kinetic friction force certainly improve in preventing the user from having muscle strain and tearing due to great reacting force of the life belt 40 when s/he falls.

Based on the above description, it is clear that the non-obvious improvement of the present invention comprises the following:

First, the base 71 of the present invention is mounted in the accommodating chamber 14 of the carrier 10, which may easily control the bore diameter of the first ring surface 715 be larger than the bore diameter of the axle hole 33 (equivalent to the inner toroidal surface of the prior case) of the rotating drum 30, so that the total circular friction area and the brake resistant arm formed through the radius of the first ring surface 715 can be larger relatively to it of U.S. Pat. No. 9,861,841 B1. Therefore, when absorbing the torque of the falling of the user, the present invention is capable of bearing wider range of torque stably than it of U.S. Pat. No. 9,861,841 B1.

Second, a base 71 and a passive ring 72 of the present invention are disposed opposite to and closely fitting to each other, so that the maximum static friction force therebetween may be adjusted through setting the fitting degree and friction coefficient, wherein the base 71 is then assembled to the carrier 10, so that maintaining or replacing the drum brake module 70 do not require disassembling of the brake unit 50, instead, only requires disassembling of the main shaft 20, the drum 30, and the turbination spring 60, so as to easily replace the drum brake module 70. Therefore, the assembly and the maintenance of the present invention are easier. Besides, the production cost of the modulized configuration of the base 71 and the passive ring 72 are relatively economical.

Third, the present invention allows the check bolt 712 to be adjusted through a torque wrench so as to tighten it for higher stress, which allows the maximum static friction force to be elastically adjusted that grants the present invention a characteristic of customization, so as for responding to the body weight of different users. On the other hand, the adjustment of the prior technology, U.S. Pat. No. 9,861,841B1, is very difficult, which characteristic of customization and overall safety are both far weaker than the present invention.

Fourth, the present invention may effectively reduce the brake lining 73, and then directly control the first ring surface 715 to fit the second ring surface 721 so that one only needs to select or test the maximum static friction force and kinetic friction force between the first ring surface 715 and the second ring surface 721 to meet the safety requirement. Accordingly, the brake lining 73 shall not be considered as a limitation of the present invention; however, if the brake lining 73 is utilized in decelerating the autorotation of the passive ring 72, it can certainly achieve a double buffering effect more easily.

What is claimed is:

1. An external drum brake anti-falling device, comprising:
   a carrier, having an accommodating chamber defined therein;
   a rotating drum comprising a life belt coiled thereon;
   a main shaft, crossingly arranged in said accommodating chamber for supporting said rotating drum to autorotate;
   a brake unit, arranged at an end of said rotating drum; and
   a drum brake module, comprising a base mounted in said accommodating chamber, a passive ring mounted on said base, and a brake lining mounted on said passive ring, wherein said base has a through hole axially and penetratingly arranged thereon and a slit radially communicating an inside and an outside of said through hole, wherein a wall surface of said through hole is regarded as a first ring surface, an outer surface of said passive ring is regarded as a second ring surface, a gap formed between said first ring surface and said second ring surface for said brake lining to be fit therein, wherein said passive ring has internally ratchet teeth arranged therein, when said life belt drives said rotating drum and said brake unit to rotate to a certain speed, said brake unit engages with said ratchet teeth under a centrifugal force, wherein when said braking unit engages with said ratchet teeth of said passive ring, said passive ring is driven to rotate, wherein when the passive ring is driven to rotate, said brake lining on said passive ring generates a friction with said first ring surface, thereby effectively decelerating rotation of said passive ring and said rotating drum so as to continuously buffer the falling speed of said life belt.

2. The external drum brake anti-falling device, as recited in claim 1, wherein said base comprises at least a check bolt crossing said slit, wherein said slit communicates with said first ring surface, so as to allow said check bolt to rotate to adjust a width of said slit in order to change a bore diameter of said first ring surface for adjusting the maximum static friction force.

3. The external drum brake anti-falling device, as recited in claim 2, wherein said brake unit comprises an abuttal arranged on the end of said rotating drum, wherein said abuttal comprises a spring seat and an axle seat, wherein said axle seat comprises a centrifugal block pivotally connected therewith and a back spring mounted between said centrifugal block and said spring seat, so as to allow said back spring to drive said centrifugal block to have a constant retracting and positioning tendency, while when said life belt drives said rotating drum to rotate in the certain speed, to allow said centrifugal block to overcome said back spring and be engaged with said ratchet teeth.

4. The external drum brake anti-falling device, as recited in claim 2, wherein said carrier has a first hole, a second hole, and a third hole arranged thereon, respectively, wherein said brake unit comprises an abuttal mounted on said rotating drum, wherein said abuttal has a fourth hole arranged at a center thereof, and a fifth hole eccentrically arranged thereof, wherein said base has a sixth hole matching said second hole, so as to allow a screw to pass through said second hole and be locked at said sixth hole, which allows said base to be detachably mounted in the accommodating chamber.

5. The external drum brake anti-falling device, as recited in claim 2, further comprising a turbination spring, wherein said rotating drum has a left end and a right end arranged opposite to said left end, and an axle hole penetratingly provided at a circle center position for said main shaft to pass through, wherein said right end has an annular protruding lip axially protruded along a periphery of said axle hole, wherein said annular protruding lip has an assembling groove arranged radially therealong and an inner end of said turbination spring is mount therewith, wherein said turbination spring further has an outer end positioned on one end of said carrier in order to constantly provide a rollback force for said rotating drum to position.

6. The external drum brake anti-falling device, as recited in claim 1, wherein said brake lining is affixed on said second ring surface.

7. The external drum brake anti-falling device, as recited in claim 1, wherein said base comprises at least a check bolt crossing said slit, wherein said slit communicates with said first ring surface, so as to allow said check bolt to rotate to adjust a width of said slit in order to change a bore diameter of said first ring surface for adjusting the precompression of the fitting of the brake lining brought by the gap.

8. The external drum brake anti-falling device, as recited in claim 7, wherein said brake lining is affixedly arranged on said second ring surface.

9. The external drum brake anti-falling device, as recited in claim 7, wherein said brake unit comprises an abuttal arranged on the end of said rotating drum, wherein said abuttal comprises a spring seat and an axle seat, wherein said axle seat comprises a centrifugal block pivotally connected therewith and a back spring mounted between said centrifugal block and said spring seat, so as to allow said back spring to drive said centrifugal block to have a constant retracting and positioning tendency, while when said life belt drives said rotating drum to rotate in the certain speed, to allow said centrifugal block to overcome said back spring and be engaged with said ratchet teeth.

10. The external drum brake anti-falling device, as recited in claim 9, wherein said carrier has a first hole, a second hole, and a third hole arranged thereon, respectively, wherein said abuttal has a fourth hole arranged at a center thereof, and a fifth hole eccentrically arranged thereof, wherein said base has a sixth hole matching said second hole, so as to allow a screw to pass through said second hole and be locked at said sixth hole, which allows said base to be detachably mounted in the accommodating chamber.

11. The external drum brake anti-falling device, as recited in claim 10, further comprising a turbination spring, wherein said rotating drum has a left end and a right end arranged opposite to said left end, and an axle hole penetratingly provided at a circle center position for said main shaft to pass through, wherein said right end has an annular protruding lip axially protruded along a periphery of said axle hole, wherein said annular protruding lip has an assembling groove arranged radially therealong and an inner end of said turbination spring is mount therewith, wherein said turbination spring further has an outer end positioned on one end of said carrier in order to constantly provide a rollback force for said rotating drum to position.

12. The external drum brake anti-falling device, as recited in claim 7, wherein said carrier has a first hole, a second hole, and a third hole arranged thereon, respectively, wherein said brake unit comprises an abuttal mounted on said rotating drum, wherein said abuttal has a fourth hole arranged at a center thereof, and a fifth hole eccentrically arranged thereof, wherein said base has a sixth hole matching said second hole, so as to allow a screw to pass through said second hole and be locked at said sixth hole, which allows said base to be detachably mounted in the accommodating chamber.

13. The external drum brake anti-falling device, as recited in claim 7, further comprising a turbination spring, wherein said rotating drum has a left end and a right end arranged opposite to said left end, and an axle hole penetratingly provided at a circle center position for said main shaft to pass through, wherein said right end has an annular protruding lip axially protruded along a periphery of said axle hole, wherein said annular protruding lip has an assembling groove arranged radially therealong and an inner end of said turbination spring is mount therewith, wherein said turbination spring further has an outer end positioned on one end of said carrier in order to constantly provide a rollback force for said rotating drum to position.

14. The external drum brake anti-falling device, as recited in claim 1, wherein said brake unit comprises an abuttal arranged on the end of said rotating drum, wherein said abuttal comprises a spring seat and an axle seat, wherein said axle seat comprises a centrifugal block pivotally connected therewith and a back spring mounted between said centrifugal block and said spring seat, so as to allow said back spring to drive said centrifugal block to have a constant retracting and positioning tendency, while when said life belt drives said rotating drum to rotate in the certain speed, to allow said centrifugal block to overcome said back spring and be engaged with said ratchet teeth.

15. The external drum brake anti-falling device, as recited in claim 1, wherein said carrier has a first hole, a second hole, and a third hole arranged thereon, respectively, wherein said brake unit comprises an abuttal mounted on said rotating drum, wherein said abuttal has a fourth hole arranged at a center thereof, and a fifth hole eccentrically arranged thereof, wherein said base has a sixth hole matching said second hole, so as to allow a screw to pass through said second hole and be locked at said sixth hole, which allows said base to be detachably mounted in the accommodating chamber.

16. The external drum brake anti-falling device, as recited in claim 1, further comprising a turbination spring, wherein said rotating drum has a left end and a right end arranged opposite to said left end, and an axle hole penetratingly provided at a circle center position for said main shaft to pass through, wherein said right end has an annular protruding lip axially protruded along a periphery of said axle hole, wherein said annular protruding lip has an assembling groove arranged radially therealong and an inner end of said turbination spring is mount therewith, wherein said turbination spring further has an outer end positioned on one end of said carrier in order to constantly provide a rollback force for said rotating drum to position.

17. An external drum brake anti-falling device, comprising:

a carrier, having an accommodating chamber defined therein;

a rotating drum comprising a life belt coiled thereon;

a main shaft, crossingly arranged in said accommodating chamber for supporting said rotating drum to autorotate;

a brake unit, arranged at an end of said rotating drum; and a drum brake module, comprising a base mounted in said accommodating chamber, a passive ring rotatably mounted on said base, and a brake lining mounted on said passive ring, wherein said base has a through hole axially and penetratingly arranged thereon and a slit radially communicating an inside and an outside of said through hole, wherein a wall surface of said through hole is regarded as a first ring surface, an outer surface of said passive ring is regarded as a second ring surface, a gap formed between said first ring surface and said second ring surface for said brake lining to be fit therein, wherein said passive ring has internally ratchet teeth arranged therein.

18. The external drum brake anti-falling device, as recited in claim 17, wherein said brake unit comprises an abuttal arranged on the end of said rotating drum, wherein said abuttal comprises a spring seat and an axle seat, wherein said axle seat comprises a centrifugal block pivotally connected therewith and a back spring mounted between said centrifugal block and said spring seat, so as to allow said back spring to drive said centrifugal block to have a constant retracting and positioning tendency, while when said life belt drives said rotating drum to rotate in a certain speed, to allow said centrifugal block to overcome said back spring and be engaged with said ratchet teeth.

* * * * *